United States Patent
Takeuchi et al.

(10) Patent No.: US 9,233,853 B2
(45) Date of Patent: Jan. 12, 2016

(54) METHOD FOR PRODUCING SILICA PARTICLES

(75) Inventors: Sakae Takeuchi, Kanagawa (JP);
Shinichiro Kawashima, Kanagawa (JP);
Hiroyoshi Okuno, Kanagawa (JP);
Hideaki Yoshikawa, Kanagawa (JP);
Yuji Masuda, Kanagawa (JP);
Shunsuke Nozaki, Kanagawa (JP);
Yuka Zenitani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1105 days.

(21) Appl. No.: 13/288,418

(22) Filed: Nov. 3, 2011

(65) Prior Publication Data

US 2012/0148470 A1 Jun. 14, 2012

(30) Foreign Application Priority Data

Dec. 13, 2010 (JP) ................ 2010-277107
Jun. 17, 2011 (JP) ................ 2011-135221

(51) Int. Cl.
*C01B 33/12* (2006.01)
*C01B 33/18* (2006.01)
*C01B 33/141* (2006.01)
*C09C 1/30* (2006.01)

(52) U.S. Cl.
CPC ............... *C01B 33/18* (2013.01); *C01B 33/12* (2013.01); *C01B 33/141* (2013.01); *C09C 1/30* (2013.01); *C09C 1/3027* (2013.01)

(58) Field of Classification Search
CPC ...... C01B 33/12; C01B 33/18; C01B 33/141; C09C 1/30; C09C 1/3027
See application file for complete search history.

(56) References Cited

U.S. PATENT DOCUMENTS

| | | |
|---|---|---|
| 2003/0134950 A1 | 7/2003 | Kudo et al. |
| 2006/0112860 A1 | 6/2006 | Yoshitake et al. |
| 2006/0171872 A1 | 8/2006 | Adams |
| 2007/0003701 A1 | 1/2007 | Yoshitake et al. |

FOREIGN PATENT DOCUMENTS

| | | |
|---|---|---|
| DE | 19810564 A1 | 9/1999 |
| EP | 0 225 785 * | 6/1987 |
| EP | 0225785 A2 | 6/1987 |
| JP | S62-138310 A | 6/1987 |
| JP | A-3-187913 | 8/1991 |
| JP | H06-40714 A | 2/1994 |
| JP | A-2000-44226 | 2/2000 |
| JP | A-2001-194824 | 7/2001 |
| JP | 2002-505956 A | 2/2002 |
| JP | A-2006-169096 | 6/2006 |
| JP | A-2007-39323 | 2/2007 |
| JP | A-2008-516889 | 5/2008 |
| JP | A-2008-174430 | 7/2008 |
| JP | A-2009-160518 | 7/2009 |

OTHER PUBLICATIONS

EP225785 A2, Iacobucci et al, Jun. 1987, machine translation.*
Jan. 6, 2015 Office Action issued in Japanese Application No. 2011-135221.

* cited by examiner

*Primary Examiner* — Melvin C Mayes
*Assistant Examiner* — Smita Patel
(74) *Attorney, Agent, or Firm* — Oliff PLC

(57) ABSTRACT

A method for producing silica particles, includes preparing a silica particle dispersion containing silica particles, and a solvent containing an alcohol and water, and bringing supercritical carbon dioxide into contact with the silica particle dispersion to remove the solvent.

14 Claims, No Drawings

METHOD FOR PRODUCING SILICA PARTICLES

CROSS-REFERENCE TO RELATED APPLICATIONS

This application is based on and claims priority under 35 USC 119 from Japanese Patent Application Nos. 2010-277107 filed Dec. 13, 2010 and 2011-135221 filed Jun. 17, 2011.

BACKGROUND

1. Technical Field

The present invention relates to a method for producing silica particles.

2. Related Art

Methods for obtaining silica particles, in which a treatment with a hydrophobization treatment agent is carried out, following by drying have been known.

SUMMARY

According to an aspect of the invention, there is provided a method for producing silica particles, including: preparing a silica particle dispersion containing silica particles, and a solvent containing an alcohol and water, and bringing supercritical carbon dioxide into contact with the silica particle dispersion to remove the solvent.

DETAILED DESCRIPTION

Exemplary embodiments of the invention will be described in detail.

The method for producing silica particles according to the present exemplary embodiment includes:

preparing a silica particle dispersion containing silica particles, and a solvent (solvent containing an alcohol and water), and bringing supercritical carbon dioxide into contact with the silica particle dispersion to remove the solvent.

In the method for producing silica particles according to the present exemplary embodiment, supercritical carbon dioxide may be brought into contact with the silica particle dispersion to remove the solvent of the silica particle dispersion, that is, to perform the drying, thereby obtaining silica particles having reduced generation of coarse powder.

The reason therefor is not clear, but is thought to be as follows.

Examples of general methods for removing the solvent of the silica particle dispersion include a method involving removing a solvent by filtration, centrifugation, distillation, or the like, and then performing drying by a vacuum dryer, a shelf dryer, or the like; a method involving drying a slurry directly by a fluidized bed dryer, a spray dryer, or the like; etc. However, since the particles are easily aggregated with each other by a liquid bridge force during the removal of the solvent, and further, it is required to set a temperature to a relatively high temperature (for example, a temperature higher than 250° C.), an elevated temperature often causes silanol groups present on the surfaces of the silica particles to be condensed, thereby generating coarse powder such as secondary aggregates and the like. In particular, silica particles (its dispersion) obtained by a wet-type method such as a sol-gel method and the like have more silanol groups on the surfaces or inside the holes, as compared with fumed silica particles or melt silica particles, obtained by a gas phase method, and thus, the above-mentioned phenomenon apparently occurs. For this reason, it can be said that it is difficult to remove the solvent of the silica particle dispersion, with the silica particles not being surface-treated.

On the other hand, in the case where the solvent of the silica particle dispersion is removed by supercritical carbon dioxide, it is thought that due to a property that supercritical carbon dioxide has "no surface tension", the solvent may be removed without causing aggregation among the particles due to a liquid bridge force during the removal of the solvent. Further, it is thought that due to a property that supercritical carbon dioxide "is carbon dioxide in the state under the temperature/pressure, each of which is equal to or more than a critical point, and has both of gas diffusivity and liquid solubility", the contact with supercritical carbon dioxide may be carried out with high efficiency at a relatively low temperature (for example, equal to or lower than 250° C.), so as to dissolve the solvent and remove the supercritical carbon dioxide having the solvent dissolved therein, and as a result, the solvent in the silica particle dispersion may be removed without causing generation of coarse powder such as secondary aggregates and the like by condensation of silanol groups.

In this regard, it is thought that silica particles having reduced generation of coarse powder may be obtained by the method for producing silica particles according to the present exemplary embodiment.

—Preparation of Silica Particle Dispersion—

The present process is a process in which a silica particle dispersion is prepared by, for example, a wet-type method (for example, a sol-gel method and the like). In particular, a silica particle dispersion is preferably obtained by a sol-gel method as a wet-type method, and specifically, a silane compound such as tetraalkoxysilane is subjected to a reaction (hydrolysis reaction and condensation reaction) in the presence of an alkaline solvent formed by adding an alkaline solvent to a solvent of an alcohol and water, thereby producing silica particles, and consequently producing a silica particle dispersion therefrom.

Further, the silica particle may be formed in either a spherical form or an irregular form.

Production of silica particles by a sol-gel method may be carried out by a well-known method, but examples of the method therefor include the methods shown below (which are hereinafter referred to as the present method for producing silica particles for description).

The present method for producing silica particles includes:

preparing an alkaline catalyst solution containing an alkaline catalyst at a concentration equal to or more than 0.6 mol/L and equal to or less than 0.85 mol/L in a solvent containing an alcohol (which may be sometimes referred to as "preparation of an alkaline catalyst solution"); and supplying tetraalkoxysilane and at the same time, supplying the alkaline catalyst in an amount equal to or more than 0.1 mol and equal to or less than 0.4 mol with respect to 1 mol of a total amount of tetraalkoxysilane to be supplied per minute, to the alkaline catalyst solution (which may be sometimes referred to as "production of particles").

That is, the present method for producing silica particles is a method in which tetraalkoxysilane as a raw material, and in addition, an alkaline catalyst as a catalyst are supplied, respectively, in the presence of an alcohol including an alkaline catalyst at the above-mentioned concentration, thus to subject the tetraalkoxysilane to a reaction, thereby producing silane particles.

With the present method for producing silica particles, by the above-mentioned technique, there is reduced generation of coarse powder, and irregular silica particles may be obtained. The reason therefor is not clear, but is thought to be as follows.

First, an alkaline catalyst solution containing an alkaline catalyst in a solvent containing an alcohol is prepared; and the tetraalkoxysilane and the alkaline catalyst are supplied, respectively, to the solution, so as to subject tetraalkoxysilane supplied in the alkaline catalyst solution to a reaction, and thus, nuclear particles are easily produced. In this regard, it is thought that if the concentration of the alkaline catalyst in the alkaline catalyst solution is within this range, irregular nuclear particles are produced while inhibiting the production of coarse powder such as secondary aggregates and the like. The alkaline catalyst is arranged on the surface of the nuclear particles produced to contribute to the shape and the dispersion stability of the nuclear particles, in addition to its catalytic action. However, it is thought that if the amount is within the ranges above, the alkaline catalyst does not cover the surfaces of the nuclear particles uniformly (that is, the alkaline catalyst is attached unevenly on the surfaces of the nuclear particles), and as a result, the dispersion stability of the nuclear particles is maintained, but partial unevenness in the surface tension and the chemical affinity of the nuclear particles occurs, and accordingly, the irregular nuclear particles are produced.

In addition, if the tetraalkoxysilane and the alkaline catalyst are continuously supplied, respectively, the reaction of the tetraalkoxysilane leads to growth of the nuclear particles produced, thereby obtaining silica particles. Here, by supplying the tetraalkoxysilane and the alkaline catalyst while maintaining the amounts satisfying the relationship therebetween, irregular nuclear particles grow as they keep their irregular forms while suppressing the production of coarse powder such as secondary aggregates and the like, and as a result, the irregular silica particles are produced. The reason for this is as follows: by satisfying the above relationship between the amounts of the tetraalkoxysilane and the alkaline catalyst each supplied, the dispersion of the nuclear particles is maintained while partial unevenness in the tension and chemical affinity on the nuclear particle surfaces are maintained, whereby the particle growth of the nuclear particles occurs while their irregular forms are maintained.

As described above, it is thought that according to the present method for producing silica particles, there is reduced generation of coarse powder and irregular silica particles may be obtained.

In addition, the irregular silica particles refer to, for example, silica particles having an average circularity equal to or more than 0.5 and equal to or less than 0.85.

Moreover, since it is thought that with the present method for producing silica particles, irregular nuclear particles are produced, and thus, nuclear particles grow while their irregular forms are maintained, thereby producing irregular silica particles having high shape stability against a mechanical load as well as low imbalance in the shape distribution.

Furthermore, since it is thought that with the present method for producing silica particles, particles grow while their irregular forms are maintained, from the irregular nuclear particles thus produced, thereby obtaining silica particles, silica particles having strong resistance against a mechanical load and low fragility.

In addition, since with the present method for producing silica particles, by supplying the tetraalkoxysilane and the alkaline catalyst, respectively, to the alkaline catalyst solution, tetraalkoxysilane is subjected to a reaction, thereby producing particles. Accordingly, as compared with a case where irregular silica particles are produced by a conventional sol-gel method, the total amount of the alkaline catalyst to be used is reduced, and as a result, omission of the process for removing the alkaline catalyst can be realized. This is advantageous, in particular, for a case where silica particles are applied in products requiring high purity.

Hereinbelow, each of the processes will be described.

First, preparation of an alkaline catalyst solution will be described.

For the preparation of an alkaline catalyst solution, a solvent containing an alcohol is prepared, and added to an alkaline catalyst, thereby preparing an alkaline catalyst solution.

The solvent containing an alcohol may be a solvent including an alcohol alone, or if desired, a mixed solvent of an alcohol with other solvents, such as water, ketones (for example, acetone, methyl ethyl ketone, methyl isobutyl ketone, and the like), cellosolves (for example, methyl cellosolve, ethyl cellosolve, butyl cellosolve, cellosolve acetate, and the like), ethers (for example, dioxane, tetrahydrofuran, and the like), etc. In the case of the mixed solvent, the amount of alcohol relative to the other solvents is preferably equal to or more than 80% by mass (preferably equal to or more than 90% by mass).

In addition, examples of the alcohol include lower alcohols such as methanol, ethanol.

On the other hand, the alkaline catalyst is a catalyst for promoting a reaction (hydrolysis reaction and condensation reaction) of tetraalkoxysilane, and examples thereof include basic catalysts such as ammonia, urea, a monoamine, quaternary ammonium salt, among which ammonia is particularly preferable.

The concentration (content) of the alkaline catalyst is equal to or more than 0.6 mol/L and equal to or less than 0.85 mol/L, preferably equal to or more than 0.63 mol/L and equal to or less than 0.78 mol/L, and more preferably equal to or more than 0.66 mol/L and equal to or less than 0.75 mol/L.

If the concentration of the alkaline catalyst is less than 0.6 mol/L, the dispersibility of the nuclear particles during the particle growth of the nuclear particles produced becomes unstable, and thus, coarse powder such as secondary aggregates is produced, gelation occurs, or particle size distribution is deteriorated in some cases.

On the other hand, if the concentration of the alkaline catalyst is more than 0.85 mol/L, the stability of the nuclear particles produced is maximized, spherical nuclear particles are produced, and thus, irregular nuclear particle may not be obtained. As a result, irregular silica particles may not be obtained.

In addition, the concentration of the alkaline catalyst is a concentration with respect to an alcohol catalyst solution (alkaline catalyst+solvent containing an alcohol).

Next, production of particles will be described.

The production of particles is a process in which tetraalkoxysilane and an alkaline catalyst are supplied to the alkaline catalyst solution, respectively, to subject the tetraalkoxysilane to a reaction (hydrolysis reaction condensation reaction) in the alkaline catalyst solution, thereby producing silica particles.

In the production of particles, at an earlier time during the supply of tetraalkoxysilane, nuclear particles are produced by the reaction of tetraalkoxysilane (production of nuclear particles), and then the nuclear particles grow (growth of nuclear particles), thereby producing silica particles.

Examples of the tetraalkoxysilane to be supplied to the alkaline catalyst solution include tetramethoxysilane, tetraethoxysilane, tetrapropoxysilane, tetrabutoxysilane, but from the viewpoints of control of the reaction speed, and the shape, particle diameter, particle size distribution, and the like of the silica particles to be obtained, tetramethoxysilane and tetraethoxysilane are preferable.

The amount of the tetraalkoxysilane to be supplied is favorably, for example, equal to or more than 0.001 mol/(mol·min) and equal to or less than 0.01 mol/(mol·min) (or from about 0.001 mol/(mol·min) to about 0.01 mol/(mol·min)), preferably equal to or more than 0.002 mol/(mol·min) and equal to or less than 0.009 mol/(mol·min), and more preferably equal to or more than 0.003 mol/(mol·min) and equal to or less 0.008 mol/(mol·min), with respect to the moles of alcohol in the alkaline catalyst solution.

By setting the amount of the tetraalkoxysilane to be supplied within the ranges above, there is reduced generation of coarse powder and irregular silica particles are easily produced.

In addition, the amount of the tetraalkoxysilane to be supplied denotes the number of moles of the tetraalkoxysilane to be supplied per minute, with respect to 1 mole of the alcohol in the alkaline catalyst solution.

On the other hand, examples of the alkaline catalyst to be supplied to the alkaline catalyst solution include those as exemplified above. The alkaline catalyst to be supplied may be the same as or different from the alkaline catalyst that is included in the alkaline catalyst solution in advance, and preferably these are the same.

The amount of the alkaline catalyst to be supplied is equal to or more than 0.1 mol and equal to or less than 0.4 mol, preferably equal to or more than 0.14 mol and equal to or less than 0.35 mol, and more preferably equal to or more than 0.18 mol and equal to or less than 0.3 mol, with respect to 1 mole of the total amount of the tetraalkoxysilane per minute.

If the amount of the alkaline catalyst to be supplied is less than 0.1 mol, the dispersibility of the nuclear particles in the growth process of the nuclear particles produced is unstable, and thus, coarse powder such as secondary aggregates is produced, gelation occurs, or particle size distribution is deteriorated in some cases.

On the other hand, if the amount of the alkaline catalyst to be supplied is more than 0.4 mol, the stability of the nuclear particles produced is maximized, and thus, even though irregular nuclear particles are produced from the nuclear production of particles, nuclear particles grow in the spherical form in the process of the nuclear particle growth, and as a result, irregular silica particles may not be obtained.

Here, in the production of particles, the tetraalkoxysilane and the alkaline catalyst are supplied, respectively, to the alkaline catalyst solution, but the supply method may be a method for continuous supply or intermittent supply.

Moreover, in the production of particles, the temperature (temperature during the supply) of the alkaline catalyst solution is preferably, for example, in the range which is equal to or higher than 5° C. and equal to or lower than 50° C., and more preferably in the range which is equal to or higher than 15° C. and equal to or lower than 40° C.

Through the above-described process, silica particles may be obtained according to the present method for producing silica particles.

In the preparation of silica particles as described above, for example, in the case of obtaining silica particles by a wet-type method, the silica particles may be obtained in the form of a dispersion (silica particle dispersion) in which silica particles are dispersed in a solvent.

Herein, when carrying out the removal of the solvent by supercritical carbon dioxide as described later, the silica particle dispersion thus prepared preferably has a mass ratio of water to the alcohol of, for example, equal to or more than 0.03 and equal to or lower than 0.3 (or from about 0.03 to about 0.3), and more preferably equal to or more than 0.05 and equal to or less than 0.2 (or from about 0.05 to about 0.2), and even more preferably equal to or more than 0.1 and equal to or less than 0.15.

In the silica particle dispersion, if the mass ratio of water to the alcohol is within the ranges above, there is reduced generation of coarse powder of silica particles, and silica particles having good electrical resistance may be obtained easily.

If the mass ratio of water to the alcohol is less than 0.03, condensation of the silanol groups on the silica particle surfaces during the removal of the solvent is extremely reduced in the removal of the solvent by supercritical carbon dioxide, the amount of moisture to be adsorbed onto the silica particle surfaces after the removal of the solvent increases, and accordingly, the electrical resistance of the silica particles is lowered too far in some cases. Further, if the mass ratio of water is more than 0.3, much water remains at around the end point of the removal of the solvent in the silica particle dispersion in the removal of the solvent by supercritical carbon dioxide, and aggregation among the silica particles by a liquid bridge force easily occurs in some cases.

Furthermore, when the removal of the solvent is carried out by supercritical carbon dioxide as described below, the silica particle dispersion to be prepared favorably has a mass ratio of water to the silica particles of, for example, equal to or more than 0.02 and equal to or less than 3 (or from about 0.02 to about 3), preferably equal to or more than 0.05 and equal to or less than 1 (or from about 0.05 to about 1), and more preferably equal to or more than 0.1 and equal to or less than 0.5.

In the silica particle dispersion, if the mass ratio of water to the silica particles is set within the ranges above, there is reduced generation of coarse powder of the silica particles and silica particles having good electrical resistance are easily obtained.

If the mass ratio of water to the silica particles is less than 0.02, condensation of the silanol groups on the silica particle surfaces during the removal of the solvent is extremely reduced during the removal of the solvent by supercritical carbon dioxide, the amount of moisture to be adsorbed onto the silica particle surfaces after the removal of the solvent increases, and accordingly, the electrical resistance of the silica particles is lowered too far in some cases. Further, if the mass ratio of water is more than 3, much water remains at around the end point of the removal of the solvent in the silica particle dispersion in the removal of the solvent by supercritical carbon dioxide, and aggregation among the silica particles by a liquid bridge force occurs easily in some cases.

Furthermore, when carrying out the removal of the solvent by supercritical carbon dioxide as described later, the silica particle dispersion thus prepared preferably has a mass ratio of the silica particles to the silica particle dispersion which is, for example, equal to or more than 0.05 and equal to or less than 0.7, and more preferably equal to or more than 0.2 and equal to or less than 0.65, and even more preferably equal to or more than 0.3 and equal to or less than 0.6.

If the mass ratio of the silica particles to the silica particle dispersion is less than 0.05, the amount of supercritical carbon dioxide to be used during the removal of the solvent by supercritical carbon dioxide increases, and thus, the productivity is lowered in some cases. Further, if the mass ratio of the silica particles to the silica particle dispersion is more than 0.7, the distance between the silica particles in the silica particle dispersion decreases, and accordingly, aggregation of the silica particles or generation of coarse powder by gelation easily occurs in some cases.

—Removal of Solvent—

The removal of the solvent is a process in which supercritical carbon dioxide is brought into contact with the silica particle dispersion to remove the solvent.

In the present process, specifically, for example, the silica particle dispersion is put into a sealed reactor. Thereafter, liquefied carbon dioxide is added into the sealed reactor, and heated, and the pressure of the inside of the reactor is elevated by high-pressure pump to bring the carbon dioxide into a supercritical state. Further, supercritical carbon dioxide is introduced into and discharged from the sealed reactor at the same time, and flowed into the reactor, that is, into the silica particle dispersion.

By this, while supercritical carbon dioxide is dissolved in a solvent (an alcohol and water), and at the same time, discharged into the outside of the silica particle dispersion (the outside of the sealed reactor) to remove the solvent.

Herein, the supercritical carbon dioxide refers to carbon dioxide which is in the state under the temperature/pressure, each of which is equal to or higher than a critical point, and has both of gas diffusivity and liquid solubility.

The temperature condition for the removal of the solvent, that is, the temperature of supercritical carbon dioxide is favorably, for example, equal to or higher than 31° C. and equal to or lower than 350° C. (or from about 31° C. to about 350° C.), preferably equal to or higher than 60° C. and equal to or lower than 300° C., and more preferably equal to or higher than 80° C. and equal to or lower than 250° C.

If the temperature is lower than the ranges above, it becomes difficult for the solvent to be dissolved in supercritical carbon dioxide, and thus, it becomes difficult to remove the solvent in some cases. Further, it is thought that coarse powder is easily generated by a liquid bridge force of the solvent or supercritical carbon dioxide in some cases. On the other hand, it is thought that if the temperature is higher than the range, coarse powder such as secondary aggregates and the like is easily generated by condensation of the silanol groups on the silica particle surfaces in some cases.

Moreover, for the temperature condition for the removal of the solvent, the optimum temperature varies according to the mass ratio of water to the alcohol in the silica particle dispersion. Water tends to be hardly dissolved in supercritical carbon dioxide, as compared with the alcohol, but the solubility tends to increase by elevating the temperature of supercritical carbon dioxide.

Therefore, it is desirable that supercritical, carbon dioxide be brought into contact with the silica particle dispersion to remove the solvent, in which y represented by Formula (1) satisfies a range of Formula (2) (preferably a range of Formula (2-1), and more preferably a range of Formula (2-2)).

$y=$((mass ratio of water in silica particle dispersion/mass ratio of alcohol in silica particle dispersion)/temperature (° C.)).   Formula (1)

"Further, the present temperature refers to a temperature at removal of the solvent".

$0.0001 \leq y \leq 0.0016$   Formula (2)

$0.0003 \leq y \leq 0.0012$   Formula (2-1)

$0.0005 \leq y \leq 0.001$   Formula (2-2)

If y represented by Formula (1) is less than the ranges, the condensation of the silanol groups on the silica particle surfaces is extremely reduced during the removal of the solvent. Thus, the moisture to be adsorbed onto the silica particle surfaces after the removal of the solvent increases, and as a result, the electrical resistance of the silica particles is extremely lowered in some cases. On the other hand, if y represented by Formula (1) is more than the ranges, much water remains at around the end point of the removal of the solvent, and aggregation among the silica particles by a liquid bridge force easily occurs in some cases.

On the other hand, the pressure condition for removal of the solvent, that is, the pressure of supercritical carbon dioxide is suitably, for example, equal to or more than 7.38 MPa and equal to or less than 40 MPa (or from about 7.38 MPa to about 40 MPa), preferably equal to or more than 10 MPa and equal to or less than 35 MPa, and more preferably equal to or more than 15 MPa and equal to or less than 25 MPa.

If the pressure is within the ranges above, the solvent tends to be hardly dissolved in supercritical carbon dioxide, whereas if the pressure is higher than the ranges above, the equipment tends to be expensive.

Furthermore, the amount of introduction/discharge of supercritical carbon dioxide into the sealed reactor is, for example, equal to or more than 15.4 L/min./m$^3$ and equal to or less than 1540 L/min./m$^3$, and preferably equal to or more than 77 L/min./m$^3$ and equal to or less than 770 L/min./m$^3$.

In the amount of introduction/discharge is less than 15.4 L/min./m$^3$, it takes time for removal of the solvent, and thus, the productivity tends to decrease.

On the other hand, if the amount of introduction/discharge is more than 1540 L/min./m$^3$, supercritical carbon dioxide is subject to a short pass, thus, the contact time of the silica particle dispersion gets shorter, and thus, there is a tendency that the solvent may not be removed efficiently.

It is preferable that the silica particles obtained by the removal of the solvent have a smaller ratio of the coarse particles with a size equal to or more than 1 μm, but it is favorably 20% by volume or less, preferably 5% by volume or less, and more preferably 1% by volume or less. If the ratio of the coarse particles with a size equal to or more than 1 μm is more than 20% by volume, crushing or sieving-classification is required, and thus the productivity decreases.

Moreover, the electrical resistance value of the silica particles obtained by the removal of the solvent is preferably equal to or more than 9 (log Ω·cm) and equal to or less than 13 (log Ω·cm). If the electrical resistance value is less than 9 (log Ω·cm) the electrical resistance of the silica particles is too low even when a hydrophobization treatment is carried out. In addition, if the electrical resistance value is more than 13 (log Ω·cm), the electrical resistance after the hydrophobization treatment becomes too high in some cases.

In addition, the silica particles obtained by removing the solvent may be subjected to a hydrophobization treatment, and used. Examples of the hydrophobization treatment agent include known organosilicon compounds containing an alkyl group (for example, a methyl group, an ethyl group, a propyl group, a butyl group, and the like), and specific examples thereof include silane compounds such as methyltrimethoxysilane, dimethyldimethoxysilane, trimethylchlorosilane, trimethylmethoxysilane, and silazane compounds such as hexamethyldisilazane, tetramethyldisilazane. The hydrophobization treatment agent may be used singly or in combination of plural kinds thereof. Among these hydrophobization treatment agents, organosilicon compounds each containing a trimethyl group, such as trimethylmethoxysilane, hexamethyldisilazane, are suitable.

Examples of the method for the hydrophobization treatment of silica particles include known methods such as a method in which silica particles are mixed in a treatment tank such as a Henschel mixer, a fluidized bed, a hydrophobization treatment agent is added thereto, and the inside of the treatment tank is heated to a high temperature to make the treatment agent gaseous, thereby subjecting the silanol groups on the silica fine particle surfaces to a reaction, and the like. The treatment temperature is not particularly limited, but it is preferably in the range of 80° C. to 200° C. The resistance value of the silica particles after the hydrophobization treatment is preferably equal to or more than 13 (log Ω·cm) and equal to or less than 17 (log Ω·cm).

EXAMPLES

Hereinafter, the present exemplary embodiments will be described in more detail with reference to Examples and Comparative Examples, but the present exemplary embodiments are not limited to these Examples in any way. Further, "parts" denotes "parts by mass" unless otherwise specified.

Example 1

(Production of Silica Particle Dispersion)
—Silica Particle Dispersion 1—
600 parts of methanol and 100 parts of 10% aqueous ammonia are added to a reaction vessel made of glass having a capacity of 3 L, equipped with a stirrer bar made of metal, a dropping nozzle (Teflon (registered trademark) microtube pump), and a thermometer, followed by mixing under stirring, to obtain an alkaline catalyst solution. The amount of the ammonia catalyst of the alkaline catalyst solution: the amount of $NH_3$ ($NH_3$ mol/(aqueous ammonia+methanol) L) is 0.68 mol/L. Then, the temperature of the alkaline catalyst solution is set to 25° C., and the alkaline catalyst solution is replaced with nitrogen, and then while stirring the alkaline catalyst solution, 450 parts of tetramethoxysilane (TMOS) in a supply amount of 15.0 g/min and 270 parts of an aqueous ammonia catalyst ($NH_3$) at a concentration of 4.4% in a supply amount of 9.0 g/min began to be dropped at the same time, and the dropping is carried out over 30 minutes, thereby obtaining a silica particle dispersion 1.
—Silica Particle Dispersions 2 to 25—
By adjusting the mass ratio of the silica particle dispersion to methanol, and the mass ratio of water to the silica particles according to Table 1, each of silica particle dispersions 2 to 25 is obtained. Adjustment of the silica particle dispersion is carried out by control during the granulation, concentration of the silica particle dispersion, and addition of water and methanol. Further, the concentration method is carried out, using a centrifuge or a press filter.
The characteristics of the silica particle dispersion thus obtained are listed in Table 1.

Example 1-1

First, 200 parts of the silica particle dispersion 1 obtained are put into a 0.65-L autoclave. Thereafter, the inside of the autoclave is filled with liquefied carbon dioxide. The temperature of the autoclave is elevated to 180° C. by a heater, and the pressure of the autoclave is elevated to 20 MPa with a carbon dioxide pump. The stirrer is operated at 200 rpm, and supercritical carbon dioxide is introduced to/discharged from the autoclave, and flowed thereinto. Further, the amount of supercritical carbon dioxide to be introduced/discharged is set to 0.1 L/min. In addition, the temperature condition is 180° C.
After the process is carried out until the solvent is removed, the inside of the autoclave is released to atmospheric pressure with a back pressure valve, and cooled to room temperature (25° C.).

Furthermore, the stirrer is stopped, and the dried powder of the silica particles is collected from the autoclave, and obtained.

Examples 1-2 to 1-25

In the same manner as in Example 1-1 except that the conditions for removing the silica particle dispersion and the solvent put into the autoclave are changed according to Table 1 in Example 1-1, dried powder of the silica particles is obtained.

Comparative Example 1-1

The silica particle dispersion 1 is spray-dried by a spray-drier (drying condition 250° C.) to obtain powder of the silica particles.
Further, in the present Comparative Example, evaluation is carried out without screening. In the case where the silica particle dispersion is dried by spray-drying, a large amount of coarse powder is generated.

Comparative Example 1-2

Methanol (400 g) is added to the silica particle dispersion 1, and the mixture is stirred, then centrifuged (rotation speed 11000 rpm) for 1 hour with a centrifuge, and subjected to solid-liquid separation, and the supernatant is removed. Methanol is added thereto to give a total amount of 600 g, and the mixture is stirred, thereby obtaining a silica particle dispersion 26.
In the same manner as in Example 1-1 except that the silica particle dispersion 26 is used, the silica particle dispersion and the solvent to be put into the autoclave, respectively, are removed according to Table 1, and dried powder of the silica particles is obtained.
Further, in the present Comparative Example, generation of coarse powder is not necessarily seen, and the electrical resistance is low, as compared with Examples.
(Evaluation)
The characteristics of the silica particles obtained in each of Examples are evaluated. Each of the characteristics is as follows. The results are shown in Table 1.
—Ratio of Coarse Powder (Coarse Particles)—
The ratio of coarse powder is measured by means of an LS Coulter (manufactured by Beckman-Coulter Corp.), and determined as a ratio of the particles having a size equal to or more than 1 μm. A smaller ratio of the coarse particles is better, but the ratio of the particles having a size equal to or more than 1 μm is favorably equal to or less than 20% by volume, preferably equal to or less than 5% by volume, and more preferably equal to or less than 1% by volume.
—Volume Resistance Value—
The volume resistivity (Ω·cm) is measured in the following manner. The measurement environment is such that the temperature is 20° C. and the humidity is 50% RH. Further, the log value of the required volume resistivity (Ω·cm) is taken as a "volume resistance value".
On the surface of a circular fixture on which a 20 $cm^2$ electrode plate has been disposed, silica particles to be measured are mounted to a thickness which is approximately equal to or more than 1 mm and equal to or less than 3 mm, thereby forming a silica particle layer. The 20 $cm^2$ electrode plate is mounted thereon, and a silica particle layer is disposed therebetween. In order to remove the voids among the silica particles, a load of 4 kg is applied on the electrode plate disposed on the silica particle layer, and then the thickness (cm) of the silica particle layer is measured. Both electrodes over and under the hydrophobic silica particle layer are connected with an electrometer and a high voltage power generator. A high voltage is applied so that the electric field on both the electrodes had a predetermined value, and by reading the current value (A) flowing at this time, the volume resistivity (Ω·cm) of the hydrophobic silica particles is calculated. The calculation formula of the volume resistivity (Ω·cm) of the silica particles is as shown below.

Further, in the formula, $\rho$ represents the volume resistivity (Ω·cm) of the hydrophobic silica particles, E represents an applied voltage (V), I represents a current value (A), $I_0$ represents the current value (A) at an applied voltage of 0 V, and L represents the thickness (cm) of the hydrophobic silica particle layer. In the present evaluation, the volume resistivity at an applied voltage of 1000 V is used.

Formula: $\rho = E \times 20/(I - I_0)/L$

TABLE 1

| | | Silica dispersion Composition of dispersion | | | | | | Conditions for removal of solvent | | Evaluation | |
|---|---|---|---|---|---|---|---|---|---|---|---|
| | | | Silica | | | Water/ | | | | | |
| | | Amount of liquid (parts) | particle (% by mass vs. dispersion) | Amount of solvent (parts) | Methanol (% by mass vs. dispersion) | Water (% by mass vs. dispersion) | Water/ methanol (mass ratio) | silica particles (mass ratio) | Formula (1) (water/ methanol/ temperature) | Temperature (° C.) | Ratio coarse powder (%) | Volume resistance value [logΩ·cm] |
| Example 1-1 | Silica dispersion 1 | 200 | 13% | 174.7 | 71.4% | 16.0% | 0.224 | 1.260 | 0.00124 | 180 | 8.0 | 10.6 |
| Example 1-2 | Silica dispersion 2 | 200 | 38% | 124.0 | 60.3% | 1.7% | 0.028 | 0.045 | 0.00016 | 180 | 0.1 | 9.0 |
| Example 1-3 | Silica dispersion 3 | 200 | 20% | 160.0 | 77.7% | 2.3% | 0.030 | 0.115 | 0.00016 | 180 | 0.1 | 9.2 |
| Example 1-4 | Silica dispersion 4 | 200 | 35% | 130.0 | 62.0% | 3.0% | 0.048 | 0.086 | 0.00027 | 180 | 0.3 | 9.7 |
| Example 1-5 | Silica dispersion 5 | 200 | 35% | 130.0 | 59.0% | 6.0% | 0.102 | 0.171 | 0.00056 | 180 | 0.6 | 10.3 |
| Example 1-6 | Silica dispersion 6 | 200 | 35% | 130.0 | 56.5% | 8.5% | 0.150 | 0.243 | 0.00084 | 180 | 0.8 | 11.5 |
| Example 1-7 | Silica dispersion 7 | 200 | 35% | 130.0 | 54.0% | 11.0% | 0.204 | 0.314 | 0.00113 | 180 | 4.0 | 12.0 |
| Example 1-8 | Silica dispersion 8 | 200 | 35% | 130.0 | 50.0% | 15.0% | 0.300 | 0.429 | 0.00150 | 200 | 16.5 | 12.8 |
| Example 1-9 | Silica dispersion 9 | 200 | 35% | 130.0 | 49.5% | 15.5% | 0.313 | 0.443 | 0.00157 | 200 | 19.0 | 12.8 |
| Example 1-10 | Silica dispersion 10 | 200 | 70% | 60.0 | 28.8% | 1.2% | 0.042 | 0.017 | 0.00052 | 80 | 0.2 | 9.1 |
| Example 1-11 | Silica dispersion 11 | 200 | 60% | 80.0 | 38.8% | 1.2% | 0.031 | 0.020 | 0.00031 | 100 | 0.1 | 9.1 |
| Example 1-12 | Silica dispersion 12 | 200 | 40% | 120.0 | 58.0% | 2.0% | 0.034 | 0.050 | 0.00034 | 100 | 0.2 | 9.5 |
| Example 1-13 | Silica dispersion 13 | 200 | 30% | 140.0 | 67.0% | 3.0% | 0.045 | 0.100 | 0.00030 | 150 | 0.5 | 10.2 |
| Example 1-14 | Silica dispersion 14 | 200 | 20% | 160.0 | 70.0% | 10.0% | 0.143 | 0.500 | 0.00095 | 150 | 0.9 | 11.0 |
| Example 1-15 | Silica dispersion 15 | 200 | 15% | 170.0 | 70.0% | 15.0% | 0.214 | 1.000 | 0.00119 | 180 | 4.5 | 11.9 |
| Example 1-16 | Silica dispersion 16 | 200 | 10% | 180.0 | 62.0% | 28.0% | 0.452 | 2.800 | 0.00151 | 300 | 15.0 | 12.5 |
| Example 1-17 | Silica dispersion 17 | 200 | 10% | 180.0 | 59.9% | 30.1% | 0.503 | 3.010 | 0.00152 | 330 | 18.0 | 12.7 |
| Example 1-18 | Silica dispersion 18 | 200 | 45% | 110.0 | 53.4% | 1.6% | 0.030 | 0.036 | 0.00009 | 330 | 0.1 | 9.3 |
| Example 1-19 | Silica dispersion 19 | 200 | 40% | 120.0 | 58.0% | 2.0% | 0.034 | 0.050 | 0.00011 | 300 | 0.1 | 9.4 |
| Example 1-20 | Silica dispersion 20 | 200 | 30% | 140.0 | 67.0% | 3.0% | 0.045 | 0.100 | 0.00030 | 150 | 0.3 | 10.0 |

TABLE 2

| | | Silica dispersion Composition of dispersion | | | | | | | Conditions for removal of solvent | | Evaluation | |
|---|---|---|---|---|---|---|---|---|---|---|---|---|
| | | Amount of liquid (parts) | Amount of Silica particle (% by mass vs. dispersion) | Amount of solvent (parts) | Methanol (% by mass vs. dispersion) | Water (% by mass vs. dispersion) | Water/ methanol (mass ratio) | Water/ silica particles (mass ratio) | Formula (1) (water/ methanol/ temperature) | Temperature (°C.) | Ratio coarse powder (%) | Volume resistance value [logΩ·cm] |
| Example 1-21 | Silica dispersion 21 | 200 | 30% | 140.0 | 64.3% | 5.7% | 0.089 | 0.190 | 0.00049 | 180 | 0.5 | 10.2 |
| Example 1-22 | Silica dispersion 22 | 200 | 30% | 140.0 | 56.0% | 14.0% | 0.250 | 0.467 | 0.00100 | 250 | 0.9 | 11.2 |
| Example 1-23 | Silica dispersion 23 | 200 | 30% | 140.0 | 56.5% | 13.5% | 0.239 | 0.450 | 0.00119 | 200 | 3.0 | 12.1 |
| Example 1-24 | Silica dispersion 24 | 200 | 30% | 140.0 | 54.5% | 15.5% | 0.284 | 0.517 | 0.00158 | 180 | 17.0 | 12.6 |
| Example 1-25 | Silica dispersion 25 | 200 | 30% | 140.0 | 54.0% | 16.0% | 0.296 | 0.533 | 0.00165 | 180 | 19.0 | 12.9 |
| Comparative Example 1-1 | Silica dispersion 1 | 200 | 13% | 174.7 | 71.4% | 16.0% | 0.224 | 1.260 | — | 250 | 60.0 | 12.0 |
| Comparative Example 1-2 | Silica dispersion 2 | 200 | 12% | 176.0 | 88.0% | 0.0% | — | — | — | 80 | 0.1 | 7.2 |

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for producing silica particles, comprising:
preparing a silica particle dispersion containing silica particles, and a solvent containing an alcohol and water, and bringing supercritical carbon dioxide into contact with the silica particle dispersion to remove the solvent,
wherein supercritical carbon dioxide is brought into contact with the silica particle dispersion to remove the solvent, in which y represented by Formula (1) satisfies a range of Formula (2-1):

$y=((\text{mass of water in silica particle dispersion/mass of alcohol in silica particle dispersion})/\text{temperature}$ (°C.) during removal of the solvent) Formula (1):

$0.0003 \leq y \leq 0.0012$ Formula (2-1).

2. The method for producing silica particles according to claim 1, wherein in the preparation of the silica particle dispersion, the mass ratio of water to the alcohol in the silica particle dispersion is from about 0.03 to about 0.3.

3. The method for producing silica particles according to claim 1, wherein in the preparation of the silica particle dispersion, the mass ratio of water to the silica particles in the silica particle dispersion is from about 0.02 to about 3.

4. The method for producing silica particles according to claim 1, wherein the silica particles are obtained by reaction of a silane compound in the presence of an alkaline catalyst.

5. The method for producing silica particles according to claim 1, wherein the mass ratio of water to the silica particles in the silica dispersion is from about 0.05 to about 1.

6. The method for producing silica particles according to claim 1, wherein in the preparation of the silica particle dispersion, the mass ratio of water to the alcohol in the silica particle dispersion is from about 0.05 to about 0.2.

7. The method for producing silica particles according to claim 1, wherein in the removal of the solvent, the temperature of supercritical carbon dioxide is in the range which is from about 31° C. to about 350° C.

8. The method for producing silica particles according to claim 1, wherein in the removal of the solvent, the pressure of supercritical carbon dioxide is in the range which is from about 7.38 MPa to about 40 MPa.

9. The method for producing silica particles according to claim 1, wherein a hydrophobization treatment is further included after removal of the solvent.

10. The method for producing silica particles according to claim 4, wherein the silane compound is tetraalkoxysilane.

11. The method for producing silica particles according to claim 10, wherein the tetraalkoxysilane is selected from tetramethoxysilane, tetraethoxysilane, tetrapropoxysilane, and tetrabutoxysilane.

12. The method for producing silica particles according to claim 10, wherein the amount of tetraalkoxysilane to be supplied is from about 0.001 mol/(mol·min) to about 0.01 mol/(mol·min) with respect to the moles of alcohol in the alkaline catalyst solution.

13. The method for producing silica particles according to claim 12, wherein the alkaline catalyst is a basic catalyst.

14. The method for producing silica particles according to claim 13, wherein the alkaline catalyst is selected from ammonia, urea, a monoamine, and a quaternary ammonium salt.

* * * * *